(12) United States Patent
Shen et al.

(10) Patent No.: US 11,338,441 B2
(45) Date of Patent: May 24, 2022

(54) CALIBRATION SYSTEM FOR ROBOT TOOL AND CALIBRATION METHOD FOR THE SAME

(71) Applicant: DELTA ELECTRONICS, INC., Taoyuan (TW)

(72) Inventors: Yi-Jiun Shen, Taoyuan (TW); Yu-Ru Huang, Taoyuan (TW); Hung-Wen Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 15 days.

(21) Appl. No.: 16/810,199

(22) Filed: Mar. 5, 2020

(65) Prior Publication Data

US 2020/0198146 A1 Jun. 25, 2020

Related U.S. Application Data

(63) Continuation-in-part of application No. 16/000,197, filed on Jun. 5, 2018, now Pat. No. 10,709,048.

(30) Foreign Application Priority Data

Dec. 1, 2017 (TW) ................................ 106142121
Jan. 2, 2020 (CN) .......................... 202010002752.7

(51) Int. Cl.
*B25J 9/16* (2006.01)

(52) U.S. Cl.
CPC ................................... *B25J 9/1692* (2013.01)

(58) Field of Classification Search
CPC .................... B25J 9/1692; G05B 2219/39025
See application file for complete search history.

(56) References Cited

U.S. PATENT DOCUMENTS

| 5,175,775 A | 12/1992 | Iwaki et al. |
| 2002/0140948 A1 | 10/2002 | Rudd et al. |

(Continued)

FOREIGN PATENT DOCUMENTS

| CN | 101060770 A | 10/2007 |
| CN | 103209809 A | 7/2013 |

(Continued)

OTHER PUBLICATIONS

Taiwanese Office Action and Search Report based on corresponding Application No. 106142121; dated May 30, 2018.

(Continued)

*Primary Examiner* — Anner N Holder
(74) *Attorney, Agent, or Firm* — Muncy, Geissler, Olds & Lowe, P.C.

(57) ABSTRACT

A calibration system for robot tool including a robot arm adopting a first coordinate system, a tool arranged on a flange of the robot arm, and an imaging device adopting a second coordinate system is disclosed, wherein an image sensing area is established by the image device. A calibration method is also disclosed and includes steps of: controlling the robot arm to move for leading a tool working point (TWP) of the tool enters the image sensing area; recording a current gesture of the robot arm as well as a specific coordinate of the TWP currently in the second coordinate system; obtaining a transformation matrix previously established for describing a relationship between the first and the second coordinate systems; and importing the specific coordinate and the current gesture to the transformation matrix for calculating an absolute position of the TWP in the first coordinate system.

12 Claims, 10 Drawing Sheets

(56) References Cited

U.S. PATENT DOCUMENTS

| | | | |
|---|---|---|---|
| 2007/0116351 A1 | 5/2007 | Duquette et al. | |
| 2011/0280472 A1 | 11/2011 | Wallack et al. | |
| 2011/0282492 A1* | 11/2011 | Krause | B25J 9/1664 |
| | | | 700/259 |
| 2011/0320039 A1* | 12/2011 | Hsu | B25J 9/1692 |
| | | | 700/254 |
| 2013/0085604 A1* | 4/2013 | Irie | B25J 9/1687 |
| | | | 700/258 |
| 2014/0130341 A1 | 5/2014 | Hung et al. | |
| 2017/0151671 A1* | 6/2017 | Ishige | B25J 9/1697 |
| 2017/0217020 A1* | 8/2017 | Suzuki | B25J 9/1692 |
| 2020/0016758 A1 | 1/2020 | Keller et al. | |

FOREIGN PATENT DOCUMENTS

| | | | |
|---|---|---|---|
| CN | 110325329 A | 10/2019 | |
| JP | S63275200 A | 11/1988 | |
| JP | H01236700 A | 9/1989 | |
| JP | 2899121 B2 | 3/1999 | |
| JP | 2015-147280 A | 8/2015 | |
| TW | 201407535 A | 2/2014 | |

OTHER PUBLICATIONS

Japanese Office Action with English Language Translation based on corresponding Application No. 2018-091708; dated Apr. 16, 2019.
Chinese Office Action and Search Report based on corresponding Application No. 201711251344.X; dated Nov. 28, 2019.

* cited by examiner

CALIBRATION SYSTEM FOR ROBOT TOOL AND CALIBRATION METHOD FOR THE SAME

CROSS-REFERENCE TO RELATED APPLICATION

This application is a continuation-in-part application of U.S. patent application Ser. No. 16/000,197, filed on Jun. 5, 2018, and entitled "SYSTEM AND METHOD FOR ASSEMBLING ELECTRONIC COMPONENTS", which claims priority to TW106142121 filed Dec. 1, 2017. This application also claims priority to CN202010002752.7 filed Jan. 2, 2020. The entire disclosures of the above applications are all incorporated herein by reference.

BACKGROUND OF THE INVENTION

1. Technical Field

The present invention relates to calibration method and system, especially to calibration method and system for tool installed on robot arm.

2. Description of Prior Art

Currently, robot arms are extensively used in automatic production. More particularly, the production line staffs generally install various kinds of tools (such as fixture tool, connection tool or welding tool) to the flange of the robot arm such that the robot arm realize the automatic process for production line with those tools.

The robot arm only knows the position of the flange thereof and does not the actual position of the Tool Working Point (TWP) of the tool. The robot arm needs calibration after it is installed or replaced with tool such that the robot controller of the robot arm may obtain the position data of the TWP.

The position accuracy of the TWP will influence the preciseness of automatic process. For example, if the position data of the TWP is erroneous, the product may be damaged during the operation of the robot arm, or even worse, the production is stagnated. It is important issue to provide effective calibration for tool.

The tool may have manufacture tolerance during production thereof and may have geometric deviation when installed to the robot arm. Besides, the tool may have gap or be deformed due to wearing after long operation time. The above factors will influence the position preciseness of the TWP of tool.

To solve above problem, the related art has following calibration methods:

(1) Manually tutoring: manually operating the robot arm to move the robot arm to the same position in the space through different gestures, thus record the position of TWP manually.

(2) Contact type calibration: the robot arm moving the tool such that the TWP sequentially touches the blocks of the calibration device in each axial direction and the directional offsets are obtained, thus calibrate the tool based on the directional offsets.

(3) Non-contact type calibration: the robot arm moving the tool in a space defined by a photo-interrupt calibration device such that the TWP of the tool reaches the light-cross point through different gestures, thus establish the sample for tool and generate the corresponding deviation amount, then the calibration device calibrates the tool based on the sample and the deviation amount.

However, the above manually tutoring calibration relies on human eyes and performs tutoring without quantification (namely, the robot arm is determined to reach the desired position or not by human eyes and experience). The calibration accuracy depends on the operator's experience and skill and is not satisfactory. In above contact type calibration, the TWP of the tool is sequentially in contact with each block, and the tool may be worn during the calibration process. The problem is worse for tool with high preciseness.

In above non-contact type calibration, the tool does not have wearing off problem. However, this calibration way can only establish the deviation amount between the TWP of tool and the flange of the robot arm and cannot obtain the absolute position of the TWP in the robot arm coordinate system. Besides, the sample needs establishing again and the new deviation amount is needed when the tool is replaced, which is cumbersome for production line staff.

SUMMARY OF THE INVENTION

It is an object of the present invention to provide calibration method and system for robot tool, the calibration method and system can effectively calibrate the tool installed on the robot arm to eliminate the manufacture tolerance of tool, the assembling offset of tool and the deviation due to wearing of tool.

Accordingly, the calibration system of the present invention includes: a robot arm adopting a first coordinate system; a tool installed on a flange of the robot arm and an imaging device adopting a second coordinate system, where the imaging device sets an image sensing area. The calibration method of the present invention includes steps of: controlling the robot arm to move such that a TWP thereof enters the image sensing area; recording a current gesture of the robot arm and a specific coordinate of the TWP of the tool in the second coordinate system; obtaining a transformation matrix recording a relationship between the first coordinate system and the second coordinate system; importing the current gesture and the specific coordinate to the transformation matrix and obtaining an absolute coordinate of the TWP in the first coordinate system.

In comparison with the related-art, the calibration system and method of the present invention does not need manual tutoring for the robot arm and uses non-contact photo-sensing scheme. Therefore, the present invention can provide calibration with enhanced preciseness and will not cause wearing of tool caused by the calibration process.

By the calibration system and method of the present invention, the absolute position of one or more TWP of the currently installed tool in the robot arm coordinate system can be obtained. In comparison with the related-art non-contact calibration method, the present invention does not need to set up sample for tool and can enhance calibration preciseness in comparison with the offset in related-art non-contact calibration method.

DETAILED DESCRIPTION OF THE INVENTION

Figure 1:
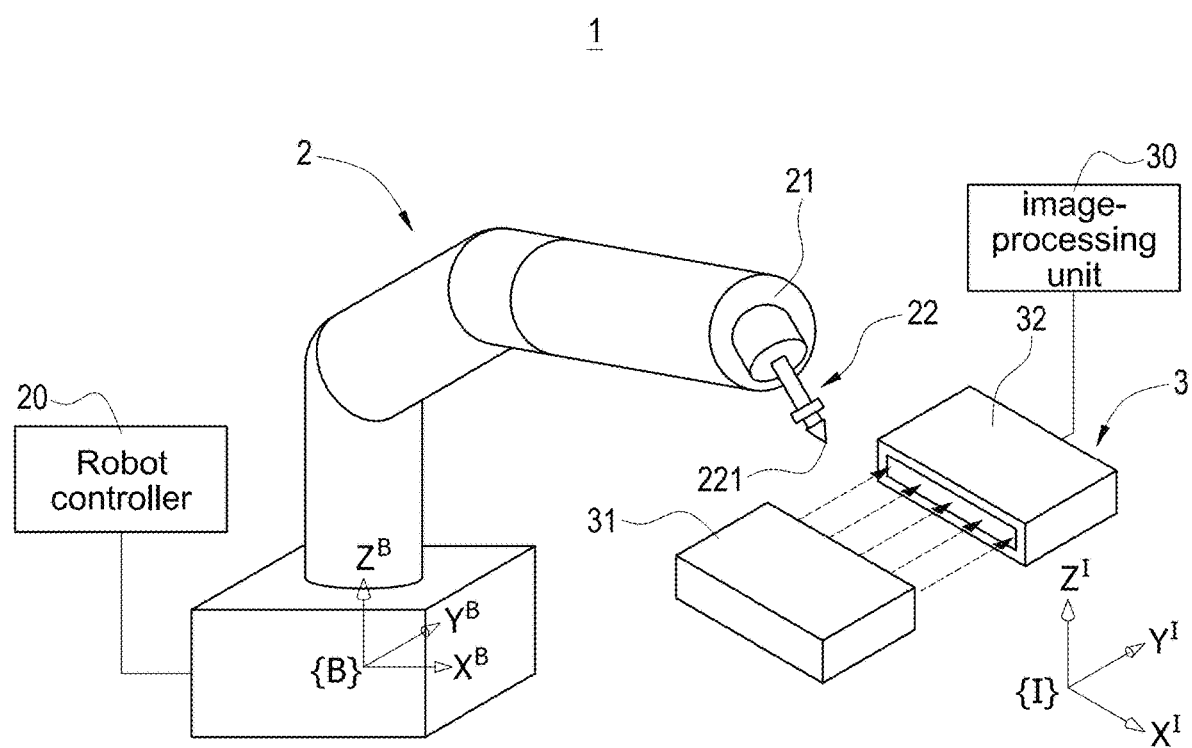
FIG. 1 shows a schematic view of a calibration system according to the first embodiment of the present invention.

Reference will now be made to the drawing figures to describe the present disclosure in detail. It will be understood that the drawing figures and exemplified example of present disclosure are not limited to the details thereof.

FIG. 1 shows a schematic view of a calibration system according to the first embodiment of the present invention. As shown in FIG. 1, a calibration system for robot tool (hereinafter, briefed as calibration system) is disclosed and includes a robot controller 20, a robot arm 2, a tool 22 and an imaging device 3.

One end of the robot arm 2 is fixed to the machine platform; the other end of the robot arm 2 is extended outward and has a flange 21. The flange 21 is well known in the art of robot and is not described in detail here. In the present invention, the robot arm 2 uses independent robot arm coordinate system. In the embodiment shown in FIG. 1, the robot arm coordinate system is labelled with {B} and the three axes of the robot arm coordinate system {B} are respectively labeled with $X^B$, $Y^B$ and $Z^B$.

The tool 22 is arranged on the flange 21 of the robot arm 2 and has a tool working point (TWP) 221 based on the working function of the tool 22. More particularly, the TWP 221 is a specific point (such as the welding point for welding tool or clamping point for fixture tool) at the tool 22 to conduct the major task of the tool 22 and can be set by user of the robot arm 2. For the sake of clear description, the below example is exemplified with single TWP 221. However, it should be noted that the tool 22 is not limited to have only one TWP 221.

One of the main objects of the present invention is to find an absolute position of the TWP 221 of the tool 22 in the robot arm coordinate system {B}, when the robot arm 2 is replaced with new tool 22, or the preciseness of the tool 22 is degraded after certain working time. After the robot controller 20 of the robot arm 2 obtains the correct position of the TWP 221 of the tool 22, it can effectively eliminate the machining tolerance of the tool 22 during manufacture, the offset of the tool 22 when assembled to the flange 21 or the deviation of the tool 22 due to wear-off.

The robot controller 20 is electrically connected to the robot arm 2 to control the movement of the robot arm 2 such as translation and rotation. When the robot arm 2 is equipped with tool 22, the robot controller 20 can perform control for the tool 22 to conduct tasks such as welding and clamping.

The imaging device 3 is arranged beside the robot arm 22 and establishes an imaging sensing area 33 within a movable range of the robot arm 2. In the present invention, the imaging device 3 uses an imaging device coordinate system, which is labeled as imaging device coordinate system {I}. The three axes of the imaging device coordinate system {I} are respectively labelled as $X^I$, $Y^I$ and $Z^I$.

It should be noted that the robot arm coordinate system {B} is known after the robot arm 2 is manufactured, while the imaging device coordinate system {I} needs to be constructed after the robot arm 2 and the imaging device 3 are set up and then imaging device coordinate system {I} is converted based on the robot arm coordinate system {B}, which will be detailed later. One of the technique features of the present invention is to define a transformation matrix for recording a relationship between the robot arm coordinate system {B} and the imaging device coordinate system {I} by the known robot arm coordinate system {B} and the imaging device coordinate system {I}. Therefore, in the calibration process of the tool 22, the robot controller 20 uses the transformation matrix to calculate an absolute position of the TWP 221 in the robot arm coordinate system {B}. In one embodiment, the absolute position of the TWP 221 in the robot arm coordinate system {B} can be labeled with $(X_t^B, Y_t^B, Z_t^B)$.

As shown in FIG. 1, the imaging device 3 mainly includes a light-source device 31, a photographing device 32 arranged parallel to the light-source device 31, and an image-processing unit 30 electrically connected to the photographing device 32. The light-source device 31 emits light toward the photographing device 32 and the photographing device 32 senses light from the light-source device 31. In this way, the imaging device 3 establishes the imaging sensing area 33 by the light source. In one embodiment, the photographing device 32 is, for example but not limited to, a camera.

In the present invention, when the TWP 221 of the tool 22 on the robot arm 2 enters the imaging sensing area 33, part of the light sensible by the photographing device 32 is interrupted by the TWP 221. Therefore, the image-processing unit 30 obtains the current position of the TWP 221 based on the interrupt information and also obtains the coordinate of the current position of the TWP 221 in imaging device coordinate system {I}. For example, the current position of the TWP 221 in the imaging device coordinate system {I} can be labeled by $(X_t^I, Y_t^I, Z_t^I)$.

In one embodiment, the light-source device 31 emits visible light of invisible light, such as X ray, laser, infrared ray, ultraviolet ray and so on. It should be noted that if each device in the calibration system 1 has sufficient safety level (such as sufficient waterproof level) and the refractive index difference of the light emitted from the light-source device in different medium can be mitigated (overcome), the calibration system 1 and the calibration method of the present invention can also be applied to other medium (such as water, oil or other solution) other than air.

The calibration system 1 of the present invention can use the robot controller 20 to control the robot arm 2 to conduct the relevant calibration procedure when the different type of tool 22 is assembled, the same type of tool 22 is replaced or the existing tool 22 is worn off after long using time.

More particularly, when the tool 22 is assembled to the flange 21 of the robot arm 2, the robot controller 20 controls the robot arm 2 to move such that the TWP 221 of the tool 22 moves into the imaging sensing area 33 established by the imaging device 3. When the TWP 221 of the tool 22 is within the imaging sensing area 33, the robot controller 20 records the current gesture of the robot arm 2 and also records a specific coordinate of the current position of the TWP 221 in the imaging device coordinate system {I} corresponding to. In the present embodiment, the current gesture is, for example but not limited to, the translation data (such as X-axis translation amount, Y-axis translation amount and Z-axis translation amount) and rotation data (such as X-axis rotation amount, Y-axis rotation amount and Z-axis rotation amount) for the origin (not shown) of the current flange 21 in the robot arm coordinate system {B}.

Afterward, the robot controller 20 imports the current gesture and the specific coordinate to the pre-established transformation matrix such that the absolute position of the TWP 221 in the robot arm coordinate system {B} can be obtained. As mentioned above, the pre-established transformation matrix records a relationship between the robot arm coordinate system {B} and the imaging device coordinate system {I}. In one example, the above-mentioned transformation matrix is, for example but not limited to, a homogeneous transformation matrix.

In a word, the calibration system 1 of the present invention can pre-establish the transformation matrix once the robot arm coordinate system {B} and the imaging device coordinate system {I} can be ensured. Therefore, the absolute position of the TWP 221 in the robot arm coordinate system {B} can be obtained by using the coordinate of the TWP 221 in the imaging device coordinate system {I}, the gesture of the robot arm 2 and the imaging device coordinate system {I} when performing calibration for the tool 22 of the robot arm 2, thus effectively enhance the operation preciseness of the robot arm 2.

Figure 2:
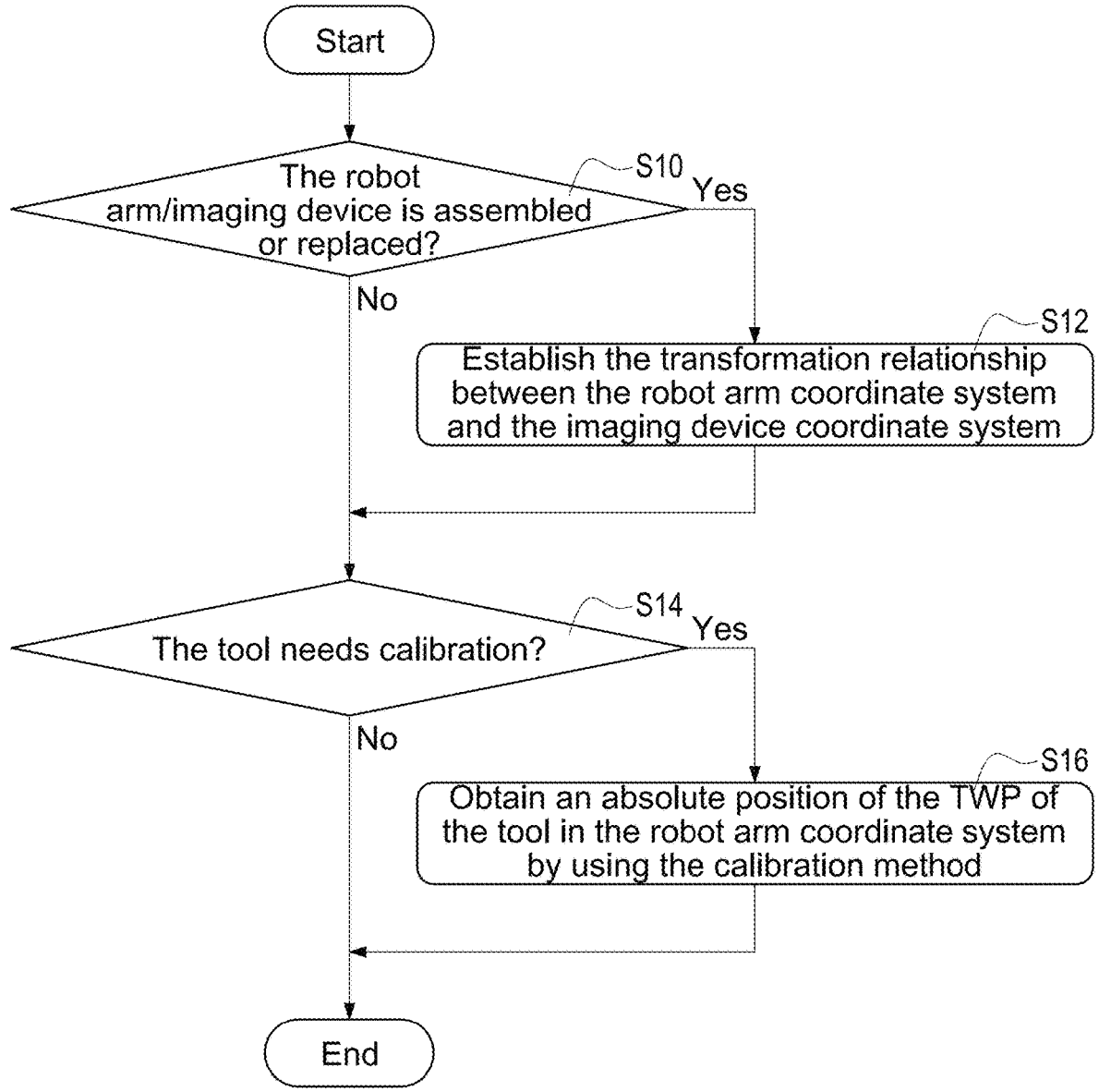
FIG. 2 sows the flowchart of the calibration method according to a first embodiment of the present invention.

Refer now to FIG. 2, which shows the flowchart of the calibration method according to a first embodiment of the present invention. At first, user confirms whether the robot arm 2/imaging device 3 in the calibration system 1 needs re-installation or replacement (step S10). If the calibration system 1 is first-time set up, or any one of the robot arm 2 and the imaging device 3 is replaced, the transformation relationship between the robot arm coordinate system {B} and the imaging device coordinate system {I} needs to establish at first (step S12), namely, establish the transformation matrix.

Afterward, user or the robot controller 20 of the calibration system 1 determines whether the tool 22 arranged on the flange 21 of the robot arm 2 needs calibration (step S14), namely, determines whether the tool 22 on the robot arm 2 needs replacement (same type or different type of tool) or determines whether the preciseness of the tool 22 degrades due to long using time.

If the tool 22 needs calibration, the calibration system 1 uses the robot controller 20 to control the robot arm 2 to move/rotate such an absolute position of the TWP 221 of the tool 22 in the robot arm coordinate system {B} can be obtained through above calibration method. (step S16) After obtaining the absolute position of the TWP 221 of the tool 22 in the robot arm coordinate system {B}, the robot controller 20 can precisely know the position of the tool 22 and the operation preciseness of the robot arm 2 can be enhanced.

Figure 3:
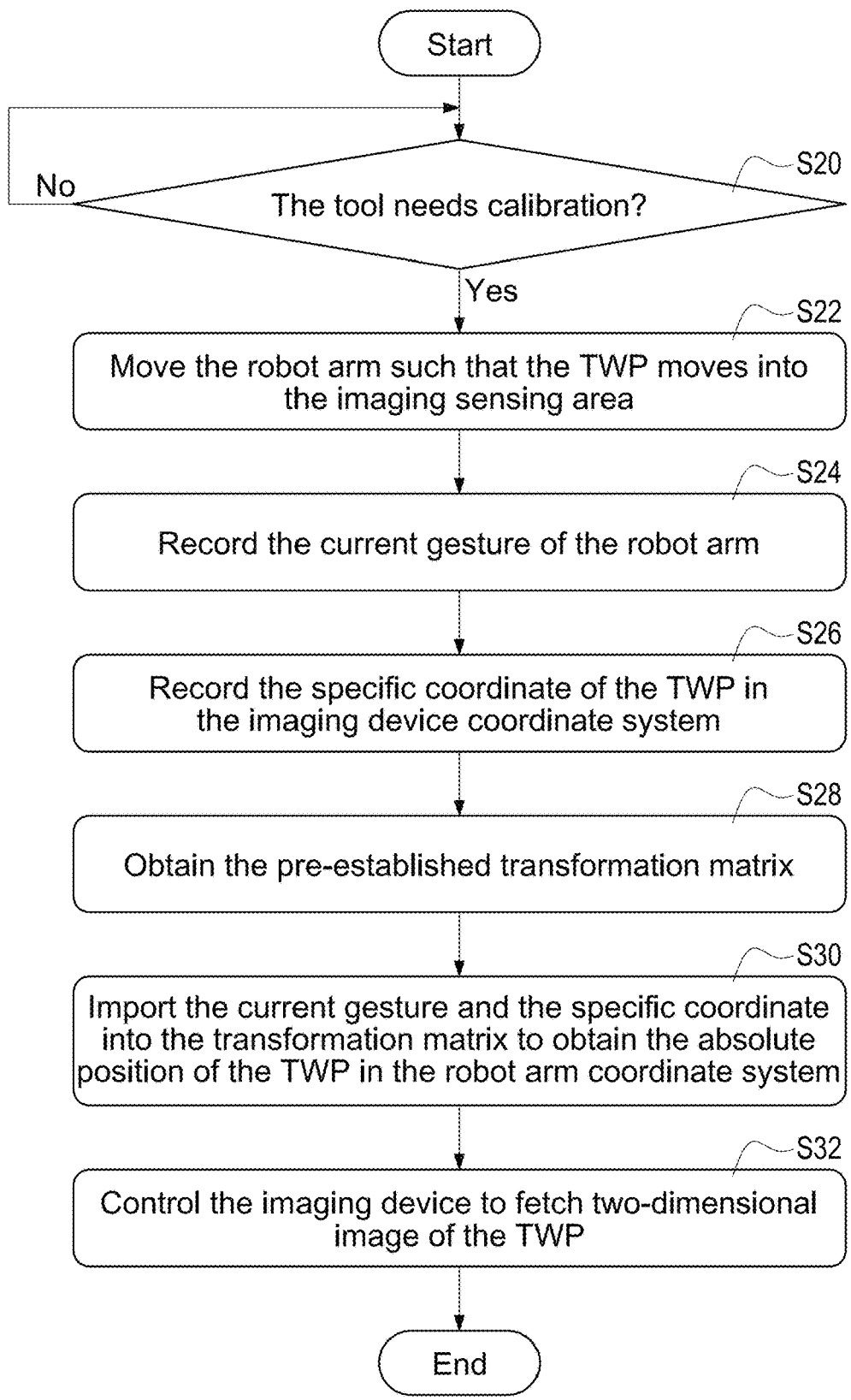
FIG. 3 shows the flowchart of the calibration method according to the second embodiment of the present invention.
Figure 4:
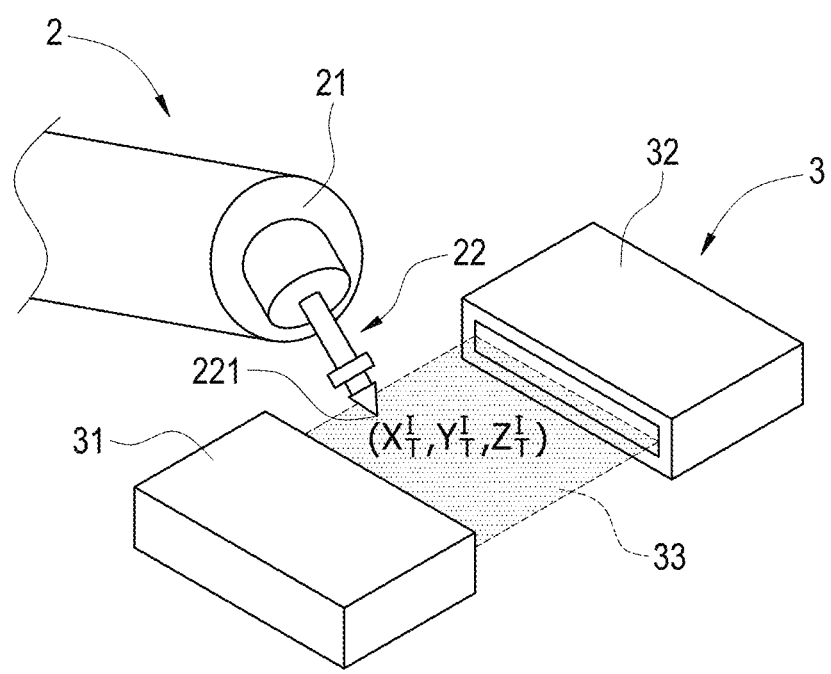
FIG. 4 is a schematic view for showing the calibration for the first embodiment.

Refer now to FIGS. 3 and 4, where FIG. 3 shows the flowchart of the calibration method according to the second embodiment of the present invention, and FIG. 4 is a schematic view for showing the calibration for the first embodiment. FIG. 3 shows the steps of the calibration method for robot tool (hereinafter, briefed as calibration method), and the calibration method can be applied to the calibration system 1 shown in FIG. 1.

As shown in FIG. 3, determination is made manually by user of the robot arm 2 or automatically by the robot controller 20 in the robot arm 2 to know whether the tool 22 of the robot arm 2 needs calibration (step S20). In one embodiment, user/the robot controller 20 determines that the tool 22 needs calibration when the tool 22 is replaced, the using time of the tool 22 exceeds a first threshold, or the preciseness of the tool 22 is smaller than a second threshold.

Afterward, when the tool 22 (new tool, or old tool needing calibration) is placed on the flange 21 of the robot arm 2, the robot controller 20 controls the robot arm 2 to move such that the TWP 221 of the tool 22 moves into the imaging sensing area 33 established by the imaging device 3 (step S22). As mentioned above, in the imaging device 3, the light-source device 31 emits light toward the photographing device 32 and the photographing device 32 senses light from the light-source device 31. In this way, the imaging device 3 establishes the imaging sensing area 33 by the light-source device.

As shown in FIG. 4, when the TWP 221 of the tool 22 is within the imaging sensing area 33, the imaging device 3 obtains the current position of the TWP 221 based on the interrupt information received by the photographing device 32 and then obtains the specific coordinate of the TWP 221 in the imaging device coordinate system {I}. In the embodiment shown in FIG. 4, the specific coordinate is labeled with $(X_t^I, Y_t^I, Z_t^I)$, where I is the imaging device coordinate system {I}, t is the TWP 221 of tool. The coordinate system {I} of the image device in the present invention is the coordinate system described by using the robot arm coordinate system {B} as a reference coordinate system (described in detail later). When the TWP 221 of the tool 22 is within the imaging sensing area 33, the robot controller 20 can obtain the specific coordinate of the TWP 221.

It should be noted that as the moving direction and angle of the robot arm 2 changes, the robot arm 2 may have different gesture. In one embodiment, the gesture may be, for example but not limited to, the translation data and rotation data of the flange 21 in the origin of the robot arm coordinate system {B}.

Refer back to FIG. 3. When the TWP 221 of the tool 22 is within the imaging sensing area 33, the robot controller 20 records the current gesture of the robot arm 2 (step S24), and at the same time records the specific coordinate of the TWP 221 in the imaging device coordinate system {I} (step S26). Afterward, the robot controller 20 further obtains the pre-established transformation matrix (step S28) and imports the current gesture and the specific coordinate of the TWP 221 into the transformation matrix, thus obtain the absolute position of the TWP 221 in the robot arm coordinate system {B} through the transformation (step S30). In this embodiment, the absolute position of the TWP 221 in the robot arm coordinate system {B} can be represented by the following formula: $P_t^B = T_I^B P_t^I$, where $P_t^B$ is a point of the TWP 221 in the robot arm coordinate system {B}, $T_I^B$ is the transformation matrix representing a relationship between the robot arm coordinate system {B} and the imaging device coordinate system {I}, and $P_t^I$ is a point of the TWP 221 in the imaging device coordinate system {I}.

It should be noted that after obtaining the absolute position of the TWP 221 in the robot arm coordinate system {B}, the robot controller 20 further controls the imaging device 3 to capture a two-dimensional image of the TWP 221 (step S32). By getting the two-dimensional image, the image-processing unit 30 can establish a vector relationship from the center of the flange 21 to the TWP 221, or directly establish a complete three-dimensional image of the tool 22, which will be detailed later. Therefore, the user of the robot arm 2 may more clearly know the configuration of the tool 22 and then determine how to set the TWP 221 or how to operate the robot arm 2.

Figure 5:
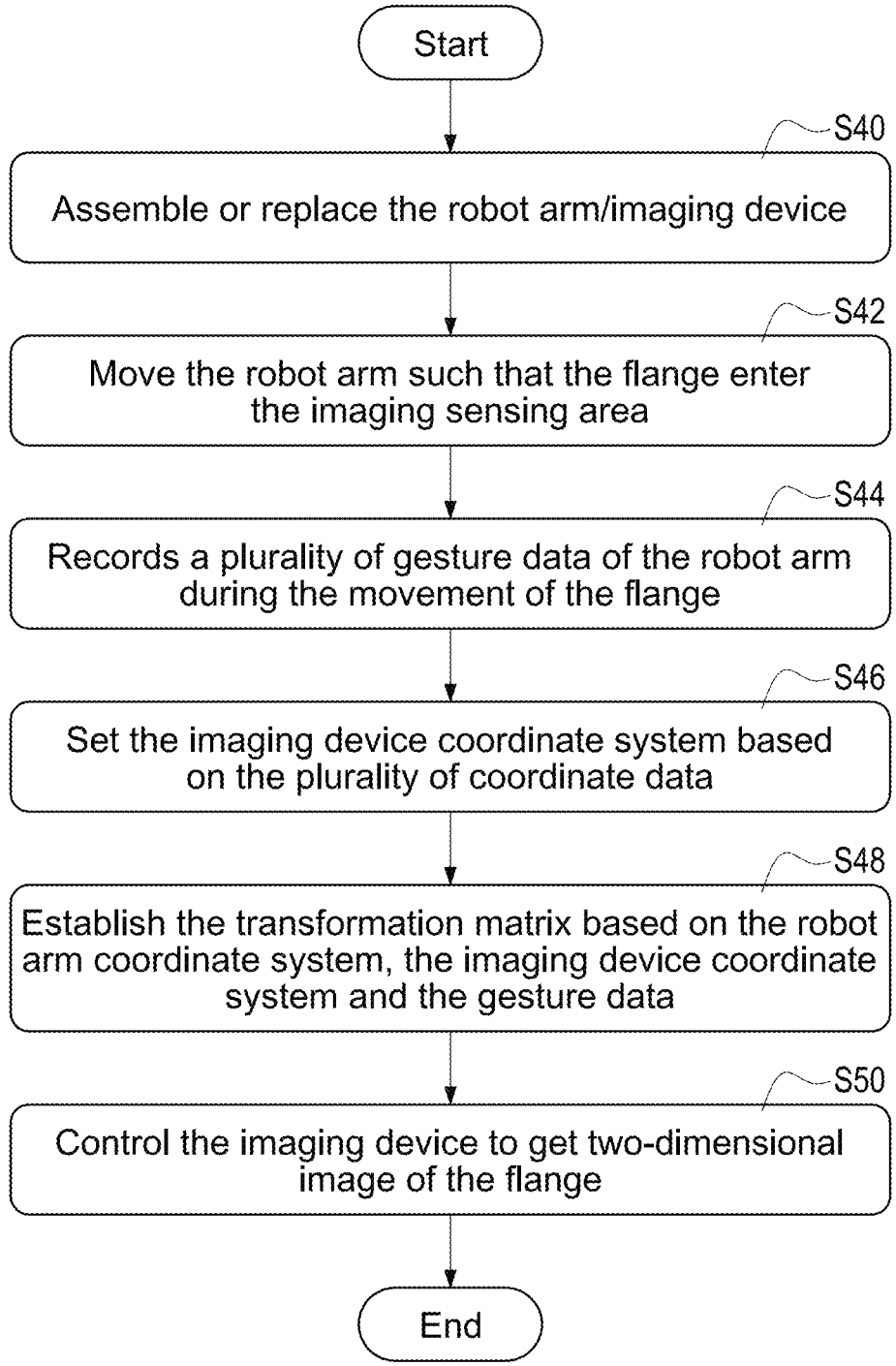
FIG. 5 shows the establishing flowchart according to the first embodiment of the present invention.

Refer to FIG. 5, this figure shows the establishing flowchart according to the first embodiment of the present invention. As mentioned above, to accurately obtain the absolute position of the TWP 221 on the robot arm coordinate system {B}, the imaging device coordinate system {I} and the transformation matrix need to be established. Therefore, the user of the robot arm 2 first assembles or replaces the robot arm 2 and/or imaging device 3 in the calibration system 1 (step S40). Only when the robot arm 2 and/or imaging device 3 is first time assembled or replaced, the steps in FIG. 5 need to be executed to re-establish the imaging device coordinate system {I} and the transformation matrix. At this time, the tool 22 is not assembled to the robot arm 2 yet.

After step S40, the controller controls the robot arm 2 to move without assembling the tool 22, so that the flange 21 of the robot arm 2 enters the imaging sensing area 33 established by the imaging device 3 (step S42). Afterward, under the control of the robot controller 20, the robot arm 2 is moved such that the flange 21 moves in the imaging sensing area 33 and the robot controller 20 records a plurality of gesture data of the robot arm 2 during the movement of the flange 21 (step S44).

In one embodiment, the gesture data includes the coordinate data of the flange 21 in the robot arm coordinate system {B} when the flange 21 is placed at various positions in the imaging sensing area 33. In another embodiment, the gesture data includes the X-axis rotation amount, Y-axis rotation amount and Z-axis rotation amount of the robot arm 2 when the flange 21 is placed at various positions in the imaging sensing area 33. However, above examples are only for demonstration and are not limitation for the present invention.

When the flange 21 moves in the imaging sensing area 33, the imaging device 3 uses the light-source device 31 and the photographing device 32 to determine the position of the flange 21 in the imaging sensing area 33, and the robot controller 20 directly reads a plurality of coordinate data in the robot arm coordinate system {B} during the movement of the flange 21. Therefore, the robot controller 20 sets the imaging device coordinate system {I} for the imaging device 3 based on the plurality of coordinate data (step S46).

Besides the plurality of coordinate data, the gesture data recorded by the robot controller 20 also includes a plurality of rotation amounts during the movement of the robot arm 2. Therefore, the robot controller 20 establishes the transformation matrix based on the known robot arm coordinate system {B}, the re-established imaging device coordinate system {I} and the recorded gesture data (step S48). After the step S48, the calibration system 1 already has the parameters needed to calibrate the absolute coordinate for the various tools arranged on the robot arm 2.

It should be noted that, after establishing the imaging device coordinate system {I} and the transformation matrix, the robot controller 20 may further control the imaging device 3 to—get two-dimensional image of the flange 21 (step S50). When the calibration system 1 obtains the two-dimensional image of the TWP 221 in the step S32 of FIG. 3, the image-processing unit 30 may establish the vector relationship from the center of the flange 21 to the TWP 221 by the two-dimensional image of the flange 21 and the two-dimensional image of the TWP 221, or directly establish the complete three-dimensional image of tool 22, which will be detailed later.

Figure 6:
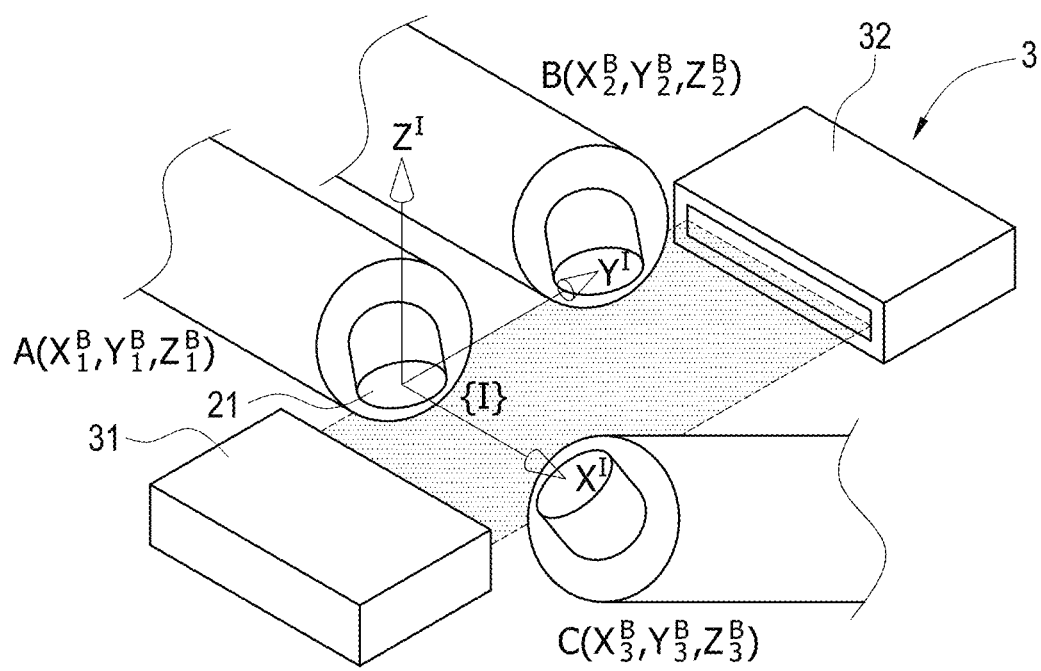
FIG. 6 shows schematic view of the established coordinate for the imaging device according to the first embodiment of the present invention.
Figure 7:
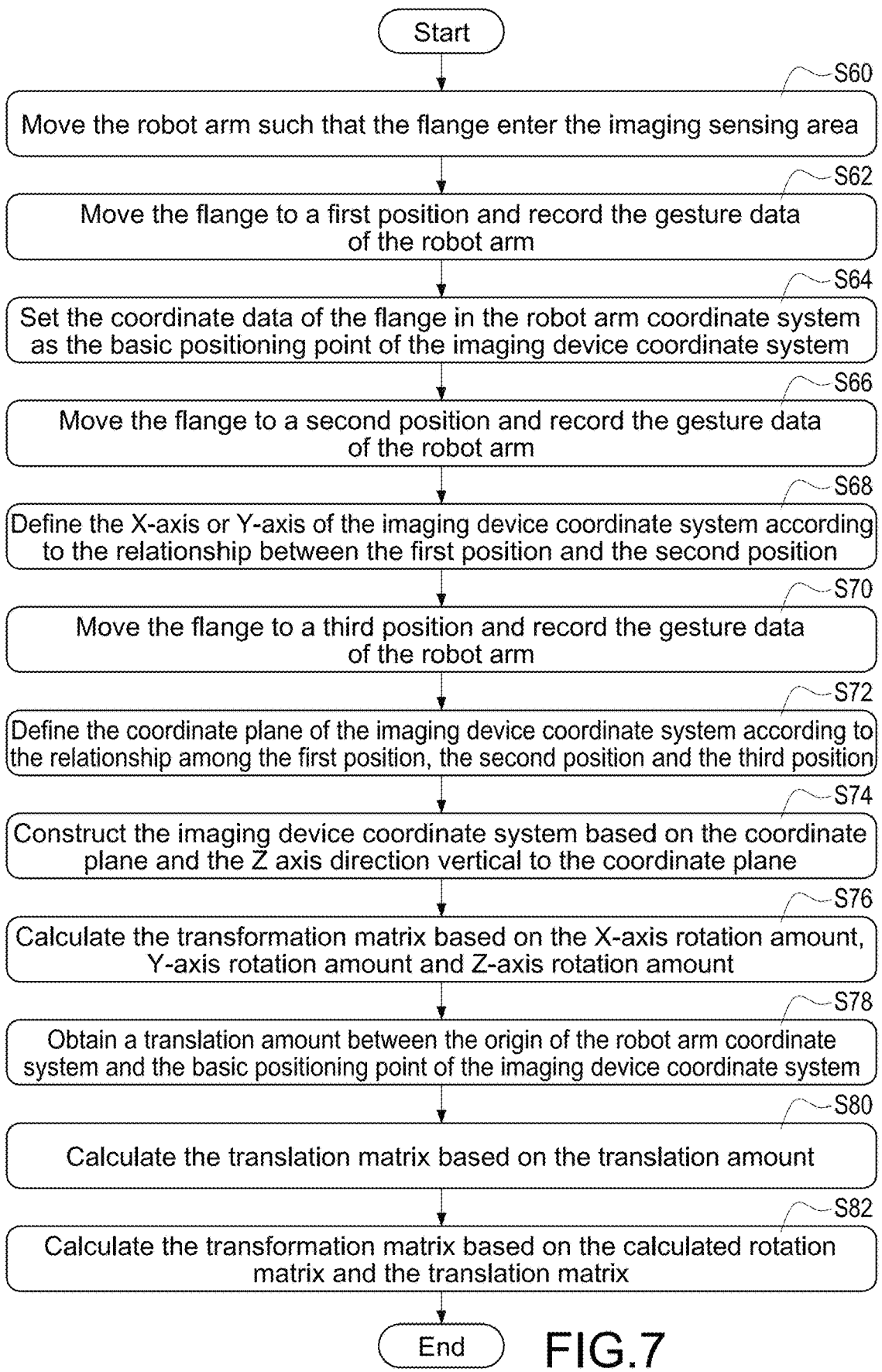
FIG. 7 shows the establishing flowchart according to the second embodiment of the present invention.

Refer now to FIGS. 6 and 7, where FIG. 6 shows schematic view of the established coordinate for the imaging device according to the first embodiment of the present invention, and FIG. 7 shows the establishing flowchart according to the second embodiment of the present invention. FIG. 7 is used to, when combining with FIG. 6, describe how to establish the imaging device coordinate system {I} and the transformation matrix based on various data by following the steps in FIG. 5.

At first, the robot controller 20 first controls the robot arm 2 to move such that the flange 21 moves into the imaging sensing area 33 of the imaging device 3 when the imaging device coordinate system {I} and/or the transformation matrix needs to establish (step S60).

It should be noted that in the step S60, the robot controller 20 mainly controls the Z axis of the flange 21 to be vertical to the plane of the imaging sensing area 33, namely, the flange 21 is parallel to the plane of the imaging device coordinate system {I} to be established. Therefore, during the later establishing procedure of the imaging device coordinate system {I}, the robot controller 20 may set the Z axis height of the robot arm 2, when the imaging device 3 first senses the flange 21, as the height corresponding to Z=0 in the imaging device coordinate system {I}.

When the flange 21 enters the imaging sensing area 33 of the imaging device 3, the robot controller 20 then controls the flange 21 to move to a first position in the imaging sensing area 33 and at the same time records the gesture data of the robot arm 2 (step S62). The gesture data at least includes a coordinate data of the flange 21 in the robot arm coordinate system {B}. Based on the coordinate data, the robot controller 20 defines the coordinate data of the flange 21 in the robot arm coordinate system {B} (when the flange 21 is at the first position in the imaging sensing area 33) as the basic positioning point of the imaging device coordinate system {I} (step S64).

In the embodiment shown in FIG. 6, the first position is labelled with $A(X_1^B, Y_1^B, Z_1^B)$, where $X_1^B$ represents the X axis coordinate of the flange 21 in the robot arm coordinate system {B} when the flange 21 is at the first position, $Y_1^B$ represents the Y axis coordinate of the flange 21 in the robot arm coordinate system {B} when the flange 21 is at the first position, and $Z_1^B$ represents the Z axis coordinate of the flange 21 in the robot arm coordinate system {B} when the flange 21 is at the first position. In the step S64, the robot controller 20 uses above coordinate data as the basic positioning points of the of the imaging device coordinate system {I}, namely uses the coordinate $A(X_1^B, Y_1^B, Z_1^B)$ as the origin of the imaging device coordinate system {I}.

Afterward, the robot controller 20 further controls the flange 21 to move to the second position in the imaging sensing area 33 while the Z-axis height of the flange 21 is not changed, and records the gesture data of the robot arm 2 at the same time (step S66). The gesture data at least includes the coordinate data of the flange 21 in the robot arm coordinate system {B}. Based on the gesture data, the robot controller 20 may define the X-axis or Y-axis of the imaging device coordinate system {I} according to the relationship between the first position and the second position (step S68).

In the embodiment shown in FIG. 6, the second position is labeled with coordinate $B(X_2^B, Y_2^B, Z_2^B)$, where $X_2^B$ represents the X axis coordinate of the flange 21 in the robot arm coordinate system {B} when the flange 21 is at the second position, $Y_2^B$ represents the Y axis coordinate of the flange 21 in the robot arm coordinate system {B} when the flange 21 is at the second position, and $Z_2^B$ represents the Z axis coordinate of the flange 21 in the robot arm coordinate system {B} when the flange 21 is at the second position. In this embodiment, the robot controller 20 establishes a virtual straight line between the first position and the second position, and defines the direction of the virtual straight line as the Y axis direction $Y^I$ of the imaging device coordinate system {I}.

Afterward, the robot controller 20 further controls the flange 21 to move the flange 21 to the third position in the imaging sensing area 33 with Z axis height unchanged, and at the same time records the gesture data of the robot arm 2 (step S70). The gesture data at least includes the coordinate data of the flange 21 in the robot arm coordinate system {B}. Based on the gesture data, the robot controller 20 may define the coordinate plane of the imaging device coordinate system {I} according to the relationship among the first position, the second position and the third position (step S72), where the coordinate plane is a plane constituted by the X axis and the Y axis.

In the embodiment shown in FIG. 6, the third position is labeled with coordinate $C(X_3^B, Y_3^B, Z_3^B)$, where $X_3^B$ represents the X axis coordinate of the flange 21 in the robot arm coordinate system {B} when the flange 21 is at the third position, $Y_3^B$ represents the Y axis coordinate of the flange 21 in the robot arm coordinate system {B} when the flange 21 is at the third position, and $Z_3^B$ represents the Z axis coordinate of the flange 21 in the robot arm coordinate system {B} when the flange 21 is at the third position. In this embodiment, the robot controller 20 establishes a virtual straight line between the first position and the third position, and defines the direction of the virtual straight line as the X axis direction $X^I$ of the imaging device coordinate system {I}. In this way, the robot controller 20 can constitute a coordinate plane based on the X axis direction $X^I$ and Y axis direction $Y^I$.

As mentioned above, the controller may define the Z axis of the imaging device coordinate system {I} when the imaging device 3 first senses the flange 21. After step S72, the robot controller 20 may construct the imaging device coordinate system {I} based on the coordinate plane and the Z axis direction $Z^I$ vertical to the coordinate plane (step S74).

It should be noted that after setting the basic positioning point, the robot controller 20 may first define the X axis direction $X^I$, or first define the Y axis direction $Y^I$. Namely, the step S66 and step S70 do not have execution order and are not limited to the order shown in FIG. 7.

In one embodiment, the transformation matrix adopted by the robot controller 20 is a Homogeneous transformation matrix and has below expression:

$$T_I^B = \begin{bmatrix} R_{3*3} & O_{3*1} \\ O_{1*3} & 1_{1*1} \end{bmatrix} = \begin{bmatrix} \text{rotation} & \text{translation} \\ \text{perspective} & \text{scale} \end{bmatrix}$$

where $T_I^B$ is a transformation matrix between the robot arm coordinate system {B} and the imaging device coordinate system {I}, the elements $R_{3*3}$, $O_{3*1}$, $O_{1*3}$ and $1_{1*1}$ in the transformation matrix respectively indicates the rotation, translation, perspective and scale relationship between the robot arm coordinate system {B} and the imaging device coordinate system {I}. When perspective and scale relationship do not exist (not present), the robot controller 20 only needs to calculate the rotation matrix and the translate matrix to successfully establish the transformation matrix.

More particularly, in the gesture data recorded in the steps S62, S66 and S70, besides recording the coordinate of the flange 21 in the robot arm coordinate system {B}, the robot controller 20 also records various rotation data during the movement of the robot arm 2 such as X-axis rotation amount, Y-axis rotation amount and Z-axis rotation amount. Therefore, the robot controller 20 may establish the transformation matrix by the recorded gesture data. As shown in FIG. 7, the robot controller 20 obtains the X-axis rotation amount, Y-axis rotation amount and Z-axis rotation amount from the recorded gesture data and the calculates the transformation matrix based on the X-axis rotation amount, Y-axis rotation amount and Z-axis rotation amount (step S76).

In one embodiment, the rotation matrix ($R_{3*3}$) is a synthesis of three successive basic rotation matrixes and can be realized by Euler angle, RPY (Roll Pitch Yaw) angle or standard rotation angle.

More particularly the Euler angle first rotates around Z axis, then around Y axis and finally around Z axis again. Therefore, the rotation matrix $(R_{3*3})=R_{zyz}=R_{z,\theta z}R_{y,\theta y}R_{z,\theta z}$ can be obtained. The RPY angle first rotates around Z axis, then around Y axis and finally around X axis. Therefore, the rotation matrix $(R_{3*3})=R_{zyx}=R_{z,\theta z}R_{y,\theta y}R_{x,\theta x}$ can be obtained. The standard rotation angle first rotates around X axis, then around Y axis and finally around Z axis. Therefore, the rotation matrix $(R_{3*3})=R_{xyz}=R_{x,\theta x}R_{y,\theta y}R_{z,\theta z}$ can be obtained.

Besides, the robot controller 20 further obtains a translation amount between the origin (such as (0, 0, 0)) of the robot arm coordinate system {B} and the basic positioning point (such as coordinate $A(X_1^B, Y_1^B, Z_1^B)$) of the imaging device coordinate system {I} (step S78) and then calculates the translation matrix ($O_{3*1}$) based on the translation amount (step S80). The translation amount at least includes the X-axis translation amount, Y-axis translation amount and Z-axis translation amount between the origin of the robot arm coordinate system {B} and the basic positioning point of the imaging device coordinate system {I}.

After the step S80, the robot controller 20 may calculate the transformation matrix based on the calculated rotation matrix and the translation matrix (step S82). After the step S82, the robot controller 20 finishes the preparation process of the calibration for arbitrary tool 22 arranged on the flange 21 of the robot arm 2, namely, finding the absolute positions of the TWP 221 in the robot arm coordinate system {B}. Therefore, the robot controller 20 can then execute the steps shown in FIG. 3 at any time to perform calibration for the arranged or replaced tool 22 on the robot arm 2.

Figure 8:
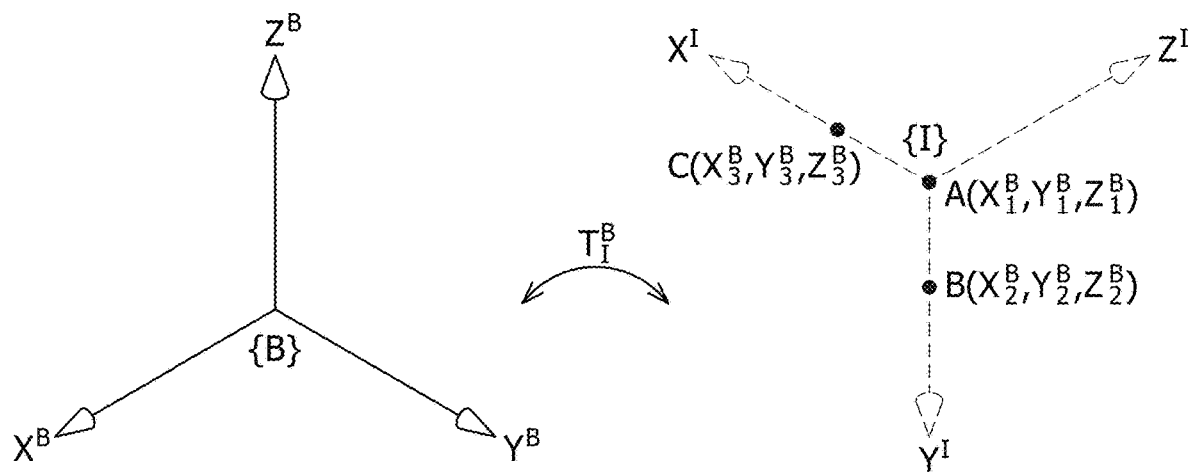
FIG. 8 shows the schematic view for the transformation matrix according to the first embodiment of the present invention.

With reference now also to FIG. 8, this figure shows the schematic view for the transformation matrix according to the first embodiment of the present invention. As shown in FIG. 8, before installing the calibration system 1, the robot controller 20 already knows the robot arm coordinate system {B}. In the embodiment shown in FIG. 8, the robot arm coordinate system {B} includes the X-axis direction $X^B$, Y-axis direction $Y^B$ and Z-axis direction $Z^B$.

Afterward, by moving the flange 21 of the robot arm 2 to the first position with coordinate $A(X_1^B, Y_1^B, Z_1^B)$, the second position with coordinate $B(X_2^B, Y_2^B, Z_2^B)$, the third position with coordinate $C(X_3^B, Y_3^B, Z_3^B)$, the robot controller 20 may establish the imaging device coordinate system {I} adopted by the imaging device 3 based on the robot arm coordinate system {B}. In the embodiment shown in FIG. 8, the imaging device coordinate system {I} includes the X-axis direction $X^I$, Y-axis direction $Y^I$ and Z-axis direction $Z^I$.

Finally, based on the known robot arm coordinate system {B}, the established imaging device coordinate system {I}, and the gesture data recorded during the movement of the robot arm 2, the robot controller 20 may construct a transformation matrix $T_I^B$ to convert the coordinate between the robot arm coordinate system {B} and the imaging device coordinate system {I}.

When the X-axis translation amount is x, the transformation matrix is:

$$T_X(x) = \begin{bmatrix} 1 & 0 & 0 & x \\ 0 & 1 & 0 & 0 \\ 0 & 0 & 1 & 0 \\ 0 & 0 & 0 & 1 \end{bmatrix}$$

When the Y-axis translation amount is y, the transformation matrix is:

$$T_Y(y) = \begin{bmatrix} 1 & 0 & 0 & 0 \\ 0 & 1 & 0 & y \\ 0 & 0 & 1 & 0 \\ 0 & 0 & 0 & 1 \end{bmatrix}$$

When the Z-axis translation amount is z, the transformation matrix is:

$$T_Z(z) = \begin{bmatrix} 1 & 0 & 0 & 0 \\ 0 & 1 & 0 & 0 \\ 0 & 0 & 1 & z \\ 0 & 0 & 0 & 1 \end{bmatrix}$$

When the X-axis rotation amount is $\theta_x$, the transformation matrix is:

$$T_X(\theta_x) = \begin{bmatrix} 1 & 0 & 0 & 0 \\ 0 & \cos\theta_x & -\sin & 0 \\ 0 & \sin\theta_x & \cos\theta_x & 0 \\ 0 & 0 & 0 & 1 \end{bmatrix}$$

When the Y-axis rotation amount is $\theta_y$, the transformation matrix is:

$$T_Y(\theta_y) = \begin{bmatrix} \cos\theta_y & 0 & \sin\theta_y & 0 \\ 0 & 1 & 0 & 0 \\ -\sin\theta_y & 0 & \cos\theta_y & 0 \\ 0 & 0 & 0 & 1 \end{bmatrix}$$

When the X-axis rotation amount is $\theta_z$, the transformation matrix is:

$$T_Z(\theta_z) = \begin{bmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{bmatrix}$$

By above transformation matrix, when the tool 22 is calibrated and moved with the robot arm 2, the robot controller 20 may directly obtain the position data of the TWP 221 of the tool 22 in the robot arm coordinate system {B}, and perform control to the robot arm 2 (and the tool 22 thereon) more precisely.

Figure 9:
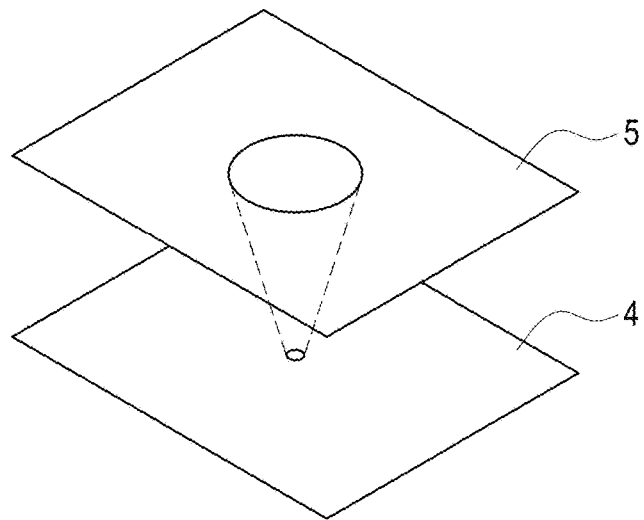
FIG. 9 shows the schematic view of the image information according to the first embodiment of the present invention.

With reference to FIG. 9, this figure shows the schematic view of the two-dimensional image according to the first embodiment of the present invention. In the step S50 of FIG. 5, the imaging device 3 fetches the two-dimensional image 5 of the flange 21 of the robot arm 2 by using the photographing device 32. In the step S32 of FIG. 3, the imaging device 3 fetches the two-dimensional image 4 of the TWP 221 of the robot arm 2 by using the photographing device 32. According to the two-dimensional images 4 and 5, the robot controller 20 may further construct the vector relationship between the center (not shown) of the flange 21 of the robot arm 2 and the TWP 221 of the tool 22. Therefore, the user of the robot arm 2 may more easily know the configuration of the currently used tool 22.

More particularly, in the step S50 of FIG. 5, the robot arm 2 is controlled by the controller 2 to rotate and the photographing device 32 fetches the plurality of one-dimensional images of the flange 21 for different rotation angles. In one embodiment, the rotation angle is, for example but not limited to, a fixed angle (such as 1 degree, 5 degrees and so on), half turn or one turn of rotation. Afterward, the imaging device 3 uses the image-processing unit 30 to capture the plurality of one-dimensional images of the flange 21 with different rotation angles taken by the photographing device 32 and performs algorithm to process the plurality of one-dimensional images into one two-dimensional image for one flange 21.

Similarly, in the step S32 of FIG. 3, the robot arm 2 is controlled by the controller 2 to rotate and the photographing device 32 captures the plurality of one-dimensional images of the TWP 221 for different rotation angles. Afterward, the image-processing unit 30 of the imaging device 3 performs algorithm to process the plurality of one-dimensional images into one two-dimensional image for one TWP 221.

In the embodiment shown in FIG. 9, the imaging device 3 only generates one two-dimensional image for the TWP 221 such that the calibration system 1 can only calculate the vector relationship between the center of the flange 21 and the TWP 221 of the tool 22 by using the robot controller 20. In other embodiment, the imaging device 3 can be controlled to generate a plurality of two-dimensional images of the tool 22. Therefore, the calibration system 1 may use the image-processing unit 30 to directly establish the complete three-dimensional images of the tool 22, which will be detailed below.

Figure 10:
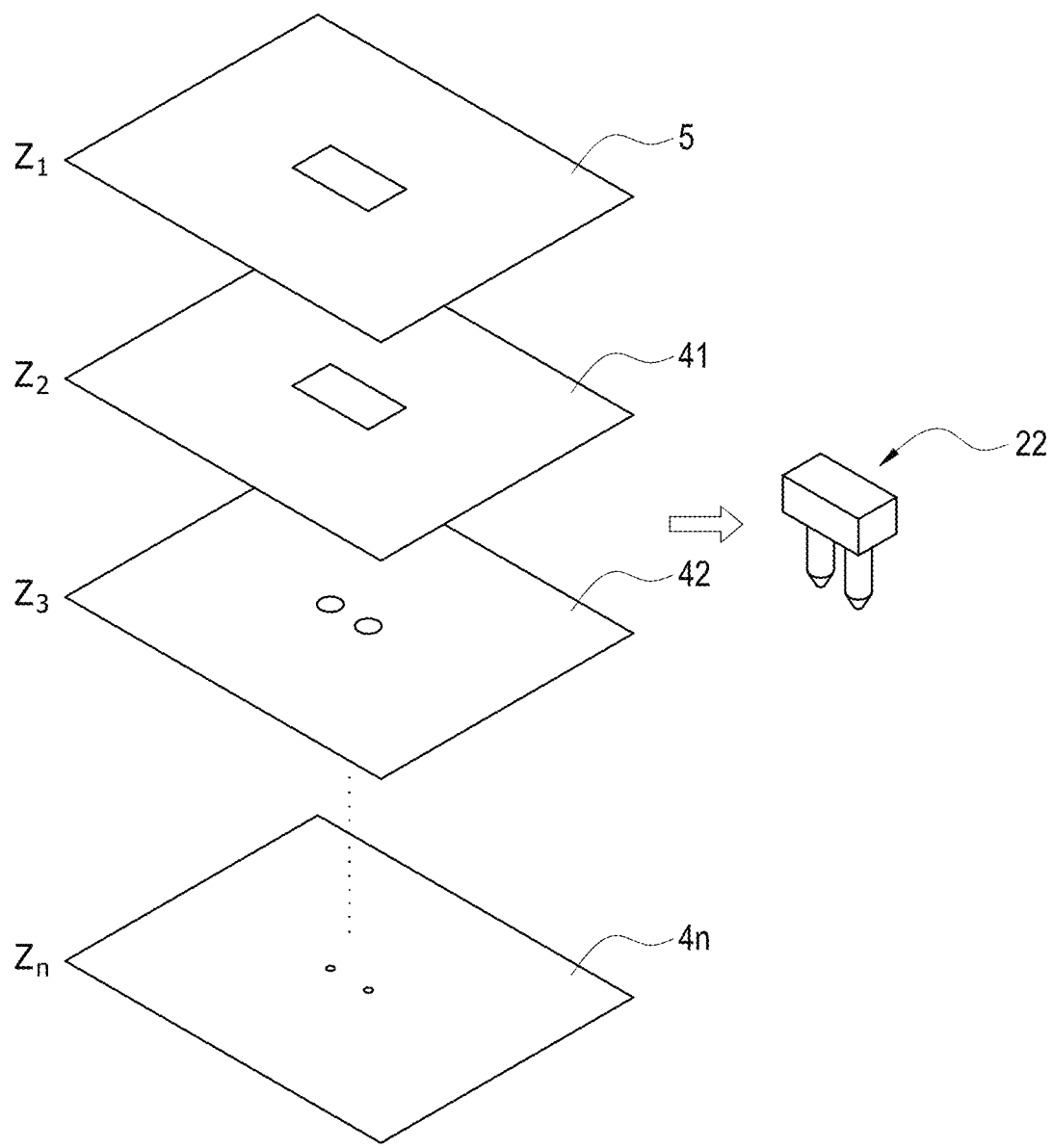
FIG. 10 shows the schematic view of the image information according to the second embodiment of the present invention.

Refer now to FIG. 10, which shows the schematic view of the two-dimensional image according to the second embodiment of the present invention.

As shown in FIG. 10, in the image capture process, the robot arm 2 can be continuously rotated by the robot controller 20 and change its height in the Z axis. At the same time, the imaging device 3 is controlled by the controller 20 to capture a two-dimensional image (such as two-dimensional image 5 of the flange) when the robot arm 2 is at the first height Z1, capture a two-dimensional image (such as two-dimensional image 41 of the tool) when the robot arm is at the second height Z2, capture a two-dimensional image (such as two-dimensional image 42 of the tool) when the robot arm is at the third height Z3 . . . and capture a two-dimensional image (such as two-dimensional image 4n of the tool) when the robot arm is at the nth height Zn. The two-dimensional image 4n of the tool is the last two-dimensional image captured by the imaging device 3 and is used to describe the TWP 221.

Figure 11:
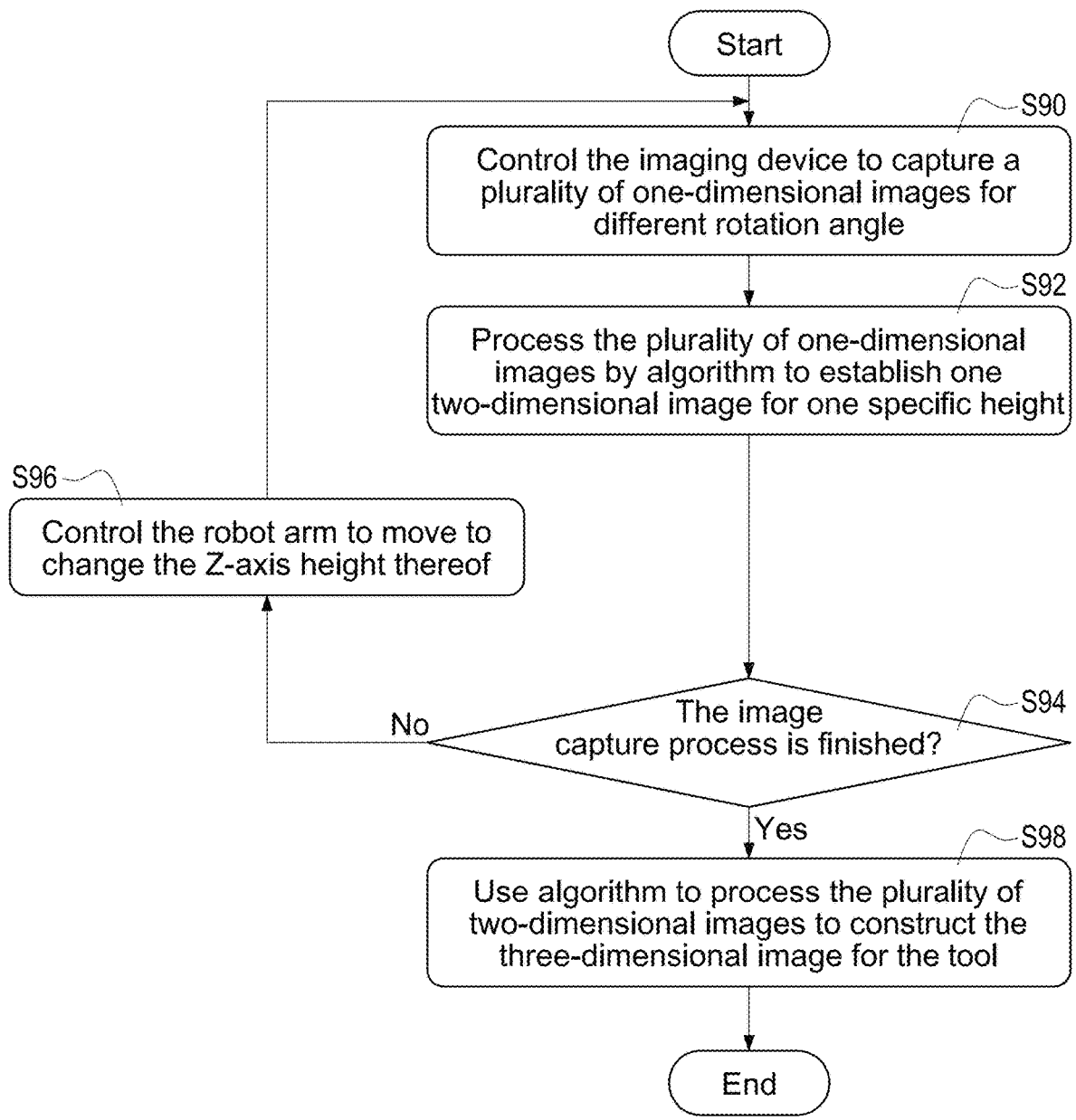
FIG. 11 shows the flowchart of constructing the three-dimensional image according to the first embodiment of the present invention.

In this embodiment, the imaging device 3 uses the image-processing unit 30 to receive the two-dimensional image 5 for flange and the plurality of two-dimensional images 41-4n of the tool and perform algorithm to process the two-dimensional images 41-4n and 5 to construct the three-dimensional image for the tool 22 currently installed on the robot arm 2. Therefore, the user can obtain the specific appearance shape, size characteristic, and other information of the tool 22 through the three-dimensional image. Refer also to FIG. 11 now, this figure shows the flowchart of constructing the three-dimensional image according to the first embodiment of the present invention. In the embodiment shown in FIG. 11, the robot controller 20 controls the robot arm 2 to move so that its tool 22 enters the imaging sensing area 33. Afterward, the controller 2 controls the robot arm 2 to rotate and controls the imaging device 3 to capture a plurality of one-dimensional images for different rotation angles (step S90). Afterward, the image-processing unit 30 processes the plurality of one-dimensional images by algorithm to establish one two-dimensional image for one specific height (step S92).

Afterward, the robot controller 20 determines whether the image fetching process is finished (step S94). Namely, the robot controller 20 determines whether the two-dimensional image of the flange 21 and the two-dimensional image of the TWP 221 have been obtained. If the robot controller 20 determines that the image capture process is not finished, the robot controller 20 controls the robot arm 2 to move to change the Z-axis height thereof (step S96) and then re-executes step S90 and S92 based on the changed Z-axis height to obtain the next two-dimensional image.

In one embodiment, the robot controller 20 may adjust the scanning height of the photographing device 32 such that the imaging device 3 first fetches the two-dimensional image of the flange 21 and then controls the robot arm 2 to move upward to increase Z-axis height in the step S96. In another embodiment, the robot controller 20 may adjust the scanning height of the photographing device 32 such that the imaging device 3 first capture the two-dimensional image of the TWP 221 and then controls the robot arm 2 to move downward to decrease Z-axis height in the step S96.

If the robot controller 20 determines that the image capture process is finished in step S94, it means that the image-processing unit 30 already obtain the plurality of two-dimensional images including the two-dimensional image 5 of the flange and the two-dimensional images 4 of the TWP. Therefore, the image-processing unit 30 may uses algorithm to process the plurality of two-dimensional images to construct the three-dimensional image for illustrating the overall appearance and shape of the tool 22 (step S98). By the three-dimensional image established by the image-processing unit 30, the user of the robot arm 2 may more clearly know the relevant information of the tool 22 to perform more precise setting or control to the robot arm 2.

In comparison with the related-art, the calibration system and method of the present invention does not need manual teaching for the robot arm and uses non-contact photo sensing scheme. Therefore, the present invention can provide calibration with enhanced preciseness and will not cause wearing of tool caused by the calibration process.

By the calibration system and method of the present invention, the absolute position of one or more TWP of the currently installed tool in the robot arm coordinate system can be obtained. The robot arm can have more precise control over the tool thereof to eliminate the manufacture tolerance of tool, the assembling deviation of tool and the deviation due to wearing of tool. In comparison with the related-art non-contact calibration method, the present invention does not need to set up sample for tool and can enhance calibration preciseness in comparison with the deviation related-art non-contact calibration method.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A calibration method for robot tool, the method applied to a calibration system with a robot arm, an imaging device and a tool, the imaging device setting an image sensing area within a movable range of the robot arm, the tool arranged on a flange of the robot arm and having a tool working point (TWP), the method comprising steps of:
   a01) controlling the robot arm to move the flange into the image sensing area when the robot arm is not installed with the tool;
   a02) controlling the flange to move in the image sensing area and recording a gesture data of the robot arm, wherein the gesture data at least comprises the coordinate data of the flange in a robot arm coordinate system when the flange is placed at a plurality of positions, and an X-axis rotation amount, a Y-axis rotation amount, and a Z-axis rotation amount for the flange when the flange is placed at each of the positions, and comprising:
   a021) controlling the flange to move to a first position in the image sensing area and defining the coordinate data of the flange in the robot arm coordinate system when the flange is at the first position as a basic positioning point in the imaging device coordinate system;
   a022) controlling the flange to move to a second position in the image sensing area with a Z-axis height of the flange keeping unchanged, and defining an X-axis direction or a Y-axis direction based on a relationship between the first position and the second position; and
   a023) controlling the flange to move to a third position in the image sensing area with the Z-axis height of the flange keeping unchanged, and defining a coordinate plane based on a relationship among the first position, the second position and the third position;
   a03) establishing an imaging device coordinate system for the imaging device based on the coordinate plane and a Z-axis direction vertical to the coordinate plane, wherein in the step a01), the flange is parallel to the coordinate plane in the imaging device coordinate system, and the robot arm sets a Z-axis height of the flange, when the imaging device first time senses the flange, as z=0 height in the imaging device coordinate system;

a04) establishing a transformation matrix based on the robot arm coordinate system, the imaging device coordinate system and the gesture data, wherein the transformation matrix records a relationship between the robot arm coordinate system and the imaging device coordinate system;

a) controlling the robot arm to move such that the TWP enters the image sensing area, wherein the robot arm adopts the robot arm coordinate system and the imaging device adopts the imaging device coordinate system, wherein the imaging device comprises a light-source device and a photographing device arranged parallel to each other, the light-source device emits a light toward the photographing device, and the photographing device receives the light for setting the image sensing area;

b) recording a current gesture of the robot arm and a specific coordinate of the TWP of the tool in the imaging device coordinate system;

c) obtaining the transformation matrix; and d) importing the current gesture and the specific coordinate to the transformation matrix and obtaining an absolute coordinate of the TWP in the robot arm coordinate system after a transformation of the transformation matrix.

2. The method in claim 1, wherein the step a04 further comprises steps of:

a041) calculating a rotation matrix based on the X-axis rotation amount, the Y-axis rotation amount, and the Z-axis rotation amount in the gesture data;

a042) obtaining an X-axis translation amount, a Y-axis translation amount, and a Z-axis translation amount between an origin of the robot arm coordinate system and the basic positioning point in the imaging device coordinate system;

a043) calculating a translation matrix based on the X-axis translation amount, the Y-axis translation amount, and the Z-axis translation amount; and a044) calculating the transformation matrix based on the rotation matrix and the translation matrix.

3. The method in claim 1, wherein the transformation matrix is a homogeneous transformation matrix.

4. The method in claim 1, after the step a04, further comprising a step a05): obtaining a two-dimensional image of the flange from the imaging device.

5. The method in claim 4, further comprising steps of:

e) using the imaging device to obtain a two-dimensional image of the TWP; and f) establishing a vector relationship between a center of the flange and the TWP based on the two-dimensional image of the flange and the two-dimensional image of the TWP.

6. The method in claim 4, further comprising steps of:

g) using the imaging to obtain a two-dimensional image of the tool;

h) determining whether an image capture process is finished;

i) changing z-axis height of the robot arm before the image capture process is finished, and re-executing the step g; and j) establishing a three-dimensional image of the tool based on the two-dimensional image of the flange and the two-dimensional images of the tool after the image capture process is finished.

7. A calibration system for robot tool, the calibration system comprising:

a robot arm comprising a flange and adopting a robot arm coordinate system;

a tool installed on the flange and comprising a tool working point (TWP);

an imaging device setting an image sensing area within a movable range of the robot arm and adopting imaging device coordinate system, comprising:

a light-source device emitting a light outward; and a photographing device arranged parallel to the light-source device and receiving the light emitted from the light-source device, wherein the imaging device sets the image sensing area by the emitted light; and a robot controller electrically connected to the robot arm, the robot controller configured to move the robot arm such that the TWP enters the image sensing area and to record a current gesture of the robot arm and a specific coordinate of the TWP of the tool in the imaging device coordinate system, whereby, when the TWP is within the imaging sensing area, the imaging device obtains the specific coordinate of the TWP in the imaging device coordinate system based on an interrupt information received by the photographing device;

wherein the robot controller imports the current gesture and the specific coordinate to a pre-established transformation matrix to obtain an absolute coordinate of the TWP in the robot arm coordinate system, the transformation matrix recording a relationship between the robot arm coordinate system and the imaging device coordinate system;

wherein, when the robot arm is not installed with the tool:

the robot controller is configured to move the robot arm such that the flange is moved in the image sensing area and to record a gesture data of the robot arm, wherein the gesture data at least comprises the coordinate data of the flange in the robot arm coordinate system when the flange is placed at a plurality of positions, and an X-axis rotation amount, a Y-axis rotation amount, and a Z-axis rotation amount for the flange when the flange is placed at each of the positions, wherein the robot controller is configured to set the flange to be parallel to the coordinate plane in the imaging device coordinate system, and to set a Z-axis height of the flange when the imaging device first time senses the flange as z=0 height in the imaging device coordinate system;

the robot controller is configured to move the flange to a first position in the image sensing area and define the coordinate data of the flange in the robot arm coordinate system when the flange is at the first position as a basic positioning point in the imaging device coordinate system;

the robot controller is then configured to move the flange to a second position in the image sensing area with Z-axis height keeping unchanged, and define an X-axis direction or a Y-axis direction based on a relationship between the first position and the second position;

the robot controller is then configured to move the flange to a third position in the image sensing area with Z-axis height keeping unchanged, and define a coordinate plane based on a relationship among the first position, the second position and the third position; and the robot controller is then configured to establish the imaging device coordinate system based on the coordinate plane and a Z-axis direction vertical to the coordinate plane; and the robot controller is configured to establish the transformation matrix based on the robot arm coordinate system, the imaging device coordinate system and the gesture data.

8. The system in claim 7, wherein, when establishing the transformation matrix, the robot controller is configured to calculate a rotation matrix based on the X-axis rotation amount, the Y-axis rotation amount, and the Z-axis rotation amount in the gesture data; then obtain an X-axis translation amount, a Y-axis translation amount, and a Z-axis translation amount between an origin of the robot arm coordinate system and the basic positioning point in the imaging device coordinate system; then calculate a translation matrix based on the X-axis translation amount, the Y-axis translation amount, and the Z-axis translation amount; and then calculate the transformation matrix based on the rotation matrix and the translation matrix.

9. The system in claim 7, wherein the transformation matrix is a homogeneous transformation matrix.

10. The system in claim 7, wherein the imaging device obtains a two-dimensional image of the flange when establishing the imaging device coordinate system.

11. The system in claim 10, wherein the imaging device obtains a two-dimensional image of the TWP; the imaging device further comprises an image processor electrically connected to the photographing device, the image processor is configured to establish a vector relationship between a center of the flange and the TWP based on the two-dimensional image of the flange and the two-dimensional image of the TWP.

12. The system in claim 10, wherein the imaging device obtains a plurality of two-dimensional images of the TWP for different Z-axis heights, and the imaging device further comprises an image processor electrically connected to the photographing device, the image processor is configured to establish a three-dimensional image of the tool based on the two-dimensional image of the flange and the two-dimensional images of the tool.

* * * * *